March 8, 1949.    R. W. HUGG    2,464,134
TELESCOPE MOUNT FOR GUNS
Filed May 8, 1944
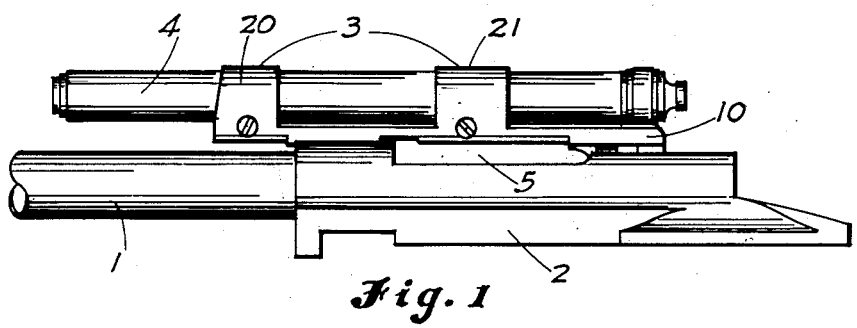
Fig. 1
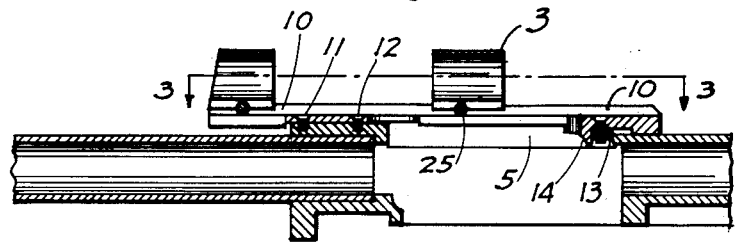
Fig. 2
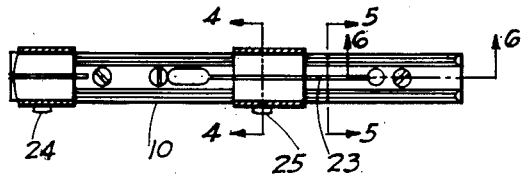
Fig. 3
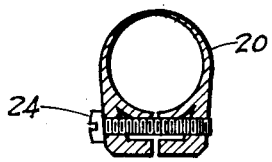   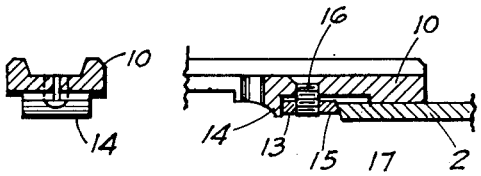
Fig. 4    Fig. 5    Fig. 6
INVENTOR.
Ralph W. Hugg
BY
Paul Bliven
ATTORNEY Patented Mar. 8, 1949

2,464,134

UNITED STATES PATENT OFFICE 2,464,134

TELESCOPE MOUNT FOR GUNS

Ralph W. Hugg, Cle Elum, Wash.

Application May 8, 1944, Serial No. 534,668

2 Claims. (Cl. 33—50)

The present invention relates to a telescope mount for guns and in particular for small arms such as rifles.

Most of the prior art mounts for telescopes require much work to be done on the gun before the mount can be placed thereon. This work usually consists in the drilling out and tapping of various holes for the reception of screws to hold the telescope mount upon the gun or rifle.

Having in mind these defects of the prior art, it is an object of the present invention to devise a telescope gun mount which may be secured to many of the existing guns by the utilization of screw holes usually found thereon, such as the screw holes for the rear sight.

Another object of the present invention is the construction of a telescope gun mount which will fit on the receiver of a gun and across the top opening thereof.

A further object of the present invention is to devise a telescope gun mount which may be quickly placed on or removed from the receiver of a gun by engaging parts of the mount with overhanging portions of the receiver.

A still further object of the present invention is the provision of a simple moveable wedge to act as a locking means for holding a telescope mount upon a gun. The above mentioned defects of the prior art are remedied and these objects attained by providing a telescope mount for guns with a base plate which is usually placed across the opening of the receiver so that the front portion of the plate comes above the place where the rear sight is usually seated, securing the forward end of this plate to the forward part of the receiver with screws placed in these screw holes for the ordinary rear sight, if necessary, giving the rear edge of the receiver opening a slight undercut with a narrow file and engaging with this undercut surface a finger or wedge which is pulled thereagainst, or toward the underside of the plate, by means of a screw or other suitable camming means.

The top of the above mentioned plate carries suitable spring loops for receiving a telescope, and screw for tightening the loops to secure the telescope in place.

A device constructed in accordance with the above outline is shown in the accompanying figures, wherein:

Figure 1 is an elevational view of a portion of a gun and receiver with the telescope mount secured thereto and a telescope in said mount.

Figure 2 is a longitudinal vertical sectional view of Figure 1.

Figure 3 is a section on the line 3—3 of Figure 2 with all parts of the gun removed from the mount.

Figure 4 is a view on the line 4—4 of Figure 3.

Figure 5 is a view on the line 5—5 of Figure 3.

Figure 6 is a view on the line 6—6 of Figure 3.

Figure 1 is an elevational view of portions of a gun showing part of the barrel 1, the receiver 2 with its moveable parts and attached stock removed, and the telescope mount 3 having therein a telescope 4.

Figure 2 is a longitudinal vertical sectional view of the material shown in Figure 1. From Figures 1 and 2 it will be seen that the telescope mount 3 fits across the receiver opening 5. The telescope mount 3 has a base plate 10 that is adapted to extend across the receiver opening 5 and to be secured at its forward end by means of two screws 11 and 12, which screws fit into the openings usually provided in this portion of the receiver for securing the rear sight to the gun.

As in Figure 6, the rearward portion of the base plate is provided with a wedge member 13 that has one face in contact with a stop member 14 and the opposite face 15 chamfered; said faces forming the inclined planes, or faces, of the wedge. The wedge is secured to the base plate 10 by means of a screw 16 therethrough and threaded into the wedge. The tapered face 15 of the wedge co-operates with a similar surface 17 arranged on the rear edge of the receiver opening. Most guns do not have this edge undercut, or tapered, and so in preparing a gun for use with this telescope mount it is usually necessary to take a narrow file and undercut this portion of the receiver a slight amount in order that the wedge member 13 will have proper contact in holding relation with the receiver.

The top side of the base plate is provided with two eyes 20, 21, or loops, adapted to fit around the usual telescope, one of these loops is placed forward of the forward securing screws and the other loop 21 is placed approximately just after the midportion of the base plate 10. The base plate adjacent and contiguous with these loops is slotted to allow some flexibility. Through the base of each of these loops and part of the base plate is passed a screw 24, 25 from one side to the other with the screw hole being threaded in the side of the base plate opposite the head of the screw, so that when the screw is tightened into this opening, it will clamp the two sides of the base plate together and draw the loop tightly about the telescope.

The tops of the forward and rearward portions of the gun receiver are usually recessed and the base of the telescope mount fits into these recesses which prevent sideways movement of the mount. The mount does not interfere with the action of the rifle or the ejection of shells, as the shells are ejected to the side and the mount fits well above the top of the receiver opening with the exception of the wedge 13.

The telescope mount is secured to the gun and its receiver by removing the rear sight from the gun, if such is thereon, placing the mount across the receiver opening, securing the forward end of the mount to the receiver by inserting screws through the mount and into the rear telscope mount screw holes, next the wedge, or hook, is placed under the rear lip 17 of the receiver, which lip has previously been formed by means of a file, if not already present, and tightening the wedge against this lip and against the stop by means of a screw 16 so that the base plate will be pulled down upon the rearward portion of the receiver and secured thereto. The telescope may be then placed in the receiver by sliding it through the loops 20 and 21, and then secured in place by tightening the screws 24 and 25 to close the loops upon the telescope. It will be found that when a telescope mount of the present construction is once fitted to the gun and the telescope adjusted for that fitting that the mount may be removed and replaced without varying the adjustment.

Having thus described my invention, I claim:

1. A telescope mount for guns, comprising: a base plate adapted to be placed across the receiver opening of the receiver of a gun and to seat and fit on and along the top surfaces of the receiver forward and rearward of the receiver opening, means for securing the forward end of said plate to the receiver forward of the receiver opening, the rear edge of such receiver opening being undercut, a wedge located below and adjacent the rear end of said plate, one of the inclined faces of said wedge adapted to contact such undercut, said plate having a stop contacting the other face of said wedge, and means between said plate and wedge for actuating said wedge along said stop and to and from said plate to secure said plate to such a receiver, and telescope securing means on and above said plate.

2. A telescope mount for guns, comprising: a base plate adapted to be placed across the receiver opening of the receiver of a gun and to seat and fit on and along the top surfaces of the receiver forward and rearward of the receiver opening, screw holes formed in the forward portion of said plate for securing the forward portion of said plate to the receiver by fitting screws through these holes and into the rear sight screw holes, the rear edge of such receiver opening being undercut, a wedge located below and adjacent the rear end of said plate, one of the inclined faces of said wedge adapted to contact such undercut, said plate having a stop contacting the other face of said wedge, and means between said plate and wedge for actuating said wedge along said stop and to and from said plate to secure said plate to such receiver, and telescope securing means on and above said plate.

RALPH W. HUGG.

REFERENCES CITED

The following references are of record in the file of this patent:

UNITED STATES PATENTS

| Number | Name | Date |
|---|---|---|
| 1,422,238 | Swebilius | July 11, 1922 |
| 2,030,312 | Mossberg | Feb. 11, 1936 |
| 2,119,925 | Peterson | June 7, 1938 |
| 2,187,054 | Redfield | Jan. 16, 1940 |
| 2,350,169 | Kesselring | May 30, 1944 |

FOREIGN PATENTS

| Number | Country | Date |
|---|---|---|
| 84,988 | Australia | Aug. 10, 1921 |